United States Patent [19]

Suzuki

[11] Patent Number: 5,232,321
[45] Date of Patent: Aug. 3, 1993

[54] APPARATUS FOR ENGRAVING IMAGES

[76] Inventor: Akira Suzuki, 19-9, Motogou 3-chome, Kawaguchi-shi, Saitama, Japan

[21] Appl. No.: 756,683

[22] Filed: Sep. 9, 1991

[51] Int. Cl.$^5$ .............................................. B23C 1/16
[52] U.S. Cl. .................................. 409/107; 409/115; 409/128; 409/289
[58] Field of Search .................... 409/84, 91, 96, 107, 409/115, 128, 131, 132, 192, 235, 289

[56] References Cited

U.S. PATENT DOCUMENTS

| | | | |
|---|---|---|---|
| 2,203,389 | 6/1940 | Kurtz | 409/107 |
| 2,331,337 | 10/1943 | Meyer | 409/84 |
| 3,930,924 | 1/1976 | Oka et al. | 156/268 |

*Primary Examiner*—Z. R. Bilinsky
*Attorney, Agent, or Firm*—Armstrong, Westerman, Hattori, McLeland & Naughton

[57] ABSTRACT

An apparatus for engraving images has an engraving table driving apparatus for making a sliding table, on which table a card on which an image is to be engraved is fixedly mounted, reciprocate from side to side; and engraving machine for performing engraving on the card by making a cutter head, disposed oppositely facing the card on the sliding table, move vertically; a base, integrally mounted with the engraving machine, which reciprocates back and forth; a belt placed in such a manner as to be movable back and forth on the top surface of the base; and a lever, rotatably mounted in a vertical direction on the base, by means of which the belt is mounted in a fastened state in the end section of the base. The operation for feeding the card to the starting point and returning them can be accomplished rapidly, and therefore the time required to engrave the card can be shortened considerably.

6 Claims, 4 Drawing Sheets

APPARATUS FOR ENGRAVING IMAGES

BACKGROUND OF THE INVENTION

1. Field of the Invention

The present invention relates to an apparatus for engraving images, such as photographs of faces, fingerprints, autographs, or the like, or information identifying one's identity, etc. (referred to as images in the present invention), on identification cards, such as licenses, company employee certificates, passports, or credit cards.

2. Description of the Related Art

As shown in FIG. 2, this type of image engraving apparatus is generally designed so that a cutter head G' of an engraving machine G is made to move vertically in a direction of the Z axis in three-dimensional coordinates via a control circuit J by a method in which an original image A and a card C are fixed on a sliding table D, light from a light source F is condensed and made to strike the original image A, and the light and shade thereof is detected by a photoreceptor I, images on a card C and other information as required are engraved by a method in which the sliding table D is moved from side to side in the direction of the X axis, and further the engraving machine G, the light source F, and the like are fed in the direction of the Y axis.

A cam or a hydraulic cylinder is used as a means for driving the sliding table D in the direction of the X axis. Since it is difficult to machine complex shapes of a cam with a high degree of accuracy, a disc-shaped eccentric cam with the center of the disc being dislocated is generally used.

A following method is used for driving the engraving machine G or the like in the direction of the Y axis: female screws are provided on a base on which the light source F, the photoreceptor I, etc. of the engraving machine G are integrally fixed; a feed operation is performed via the female screws by screwing a screw shaft and by rotating this screw shaft. When a return operation is performed, a method for rotating a screw shaft reversely is used.

However, when an eccentric cam is used in a method for driving the sliding table d, the radius of the rotation is large. Thus, a large space is required and therefore the apparatus has to be enlarged. Also, when dust or dirt is stuck on the surface of the eccentric cam, the sliding table D is fed nonuniformly. As a result, interference fringes occur in the image to be engraved and accurate engraving cannot be performed. When a hydraulic cylinder is used to drive the sliding table D, an extra attachment, such as an oil pressure generator, or the like, is required. Thus, the entire apparatus becomes enlarged and the cost thereof increases.

On the other hand, when the above-described conventional technique is used as a method for driving the engraving machine G or the like in the direction of the Y axis, a return operation takes the same amount of time to performs as a feed operation. Thus, when a large amount of cards have to be processed, a considerable time is needed to complete such a process. As a result, such a process is inefficient.

The present invention has been devised to solve the above-mentioned problems of the prior art. In the present invention, a sliding table is so driven that it is not necessary to enlarge the apparatus. In addition, defects, such as interference fringes or the like, do not occur due to the deviation of the driving section because of dust or dirt. An object of the present invention is to process a large amount of cards clearly and speedily by making it possible to perform a fast return operation of an engraving machine.

To this end, according to the present invention, there is provided an apparatus for engraving images, comprising an engraving table driving apparatus for making a sliding table, on which table a card on which an image is to be engraved is mounted and fixed, reciprocate from side to side, an engraving machine for performing engraving on the card by making a cutter head disposed facing the card on the sliding table move vertically, a base which reciprocates back and forth, on which the engraving machine is integrally mounted, a belt disposed in such a manner as to be capable of running back and forth on the top surface of the base, and a lever pivotally mounted in such a manner as to be capable of rotating vertically on the base.

In the present invention, it is preferable that the opening/closing end of a lever for mounting a belt in a fastened state, disposed on the base in such a manner as to be rotatable vertically and capable of running back and forth on the top surface of the base, be connected to an eccentric cam in such a manner as to be capable of moving in linkage therewith in order that the belt be mounted on the base by the downward movement of the lever and that the base be driven back and forth via the belt. Furthermore, it is preferable that the back end of an arm rotatably supported in a vertical direction by a pivoted pin with the engraving machine being mounted on the front end is connected through a connecting material to the lever for fastening a belt pivotally mounted on the base in such a manner as to be rotatable vertically, and capable of running back and forth on the top surface of the end of the base, in linkage with each other, in order that the engraving machine is moved vertically according to the upward and downward movement of the lever.

In addition, in the present invention, it is desirable that the following be provided on the bottom surface of the base integrally mounted with an engraving machine, in order that the engraving machine is moved back and forth via the base by absorbing the eccentricity of the screw shaft: an elastic connecting thin plate to which two elastic swing plates are vertically provided oppositely facing each other on the right and left by bending elastic thin plates in the form of the letter L on the bottom surface thereof; gear wheels disposed horizontally side by side by being pressed upward by a pressing spring with a friction plate being interposed between the connecting thin plates and it on the bottom part of the elastic swing plate; a spring energized toward the inside by being stretched mutually in the lower end thereof; and a screw shaft engaged by fastening and pressing it with the gear wheel.

These and other objects, features and advantages of the present invention will become clear when reference is made to the following description of the preferred embodiment of the present invention, together with reference to the accompanying drawings.

DESCRIPTION OF THE PREFERRED EMBODIMENT

The present invention will be explained below in more detail with reference to the embodiment shown. Of course, the present invention is not limited to these embodiment.

Figure 1:
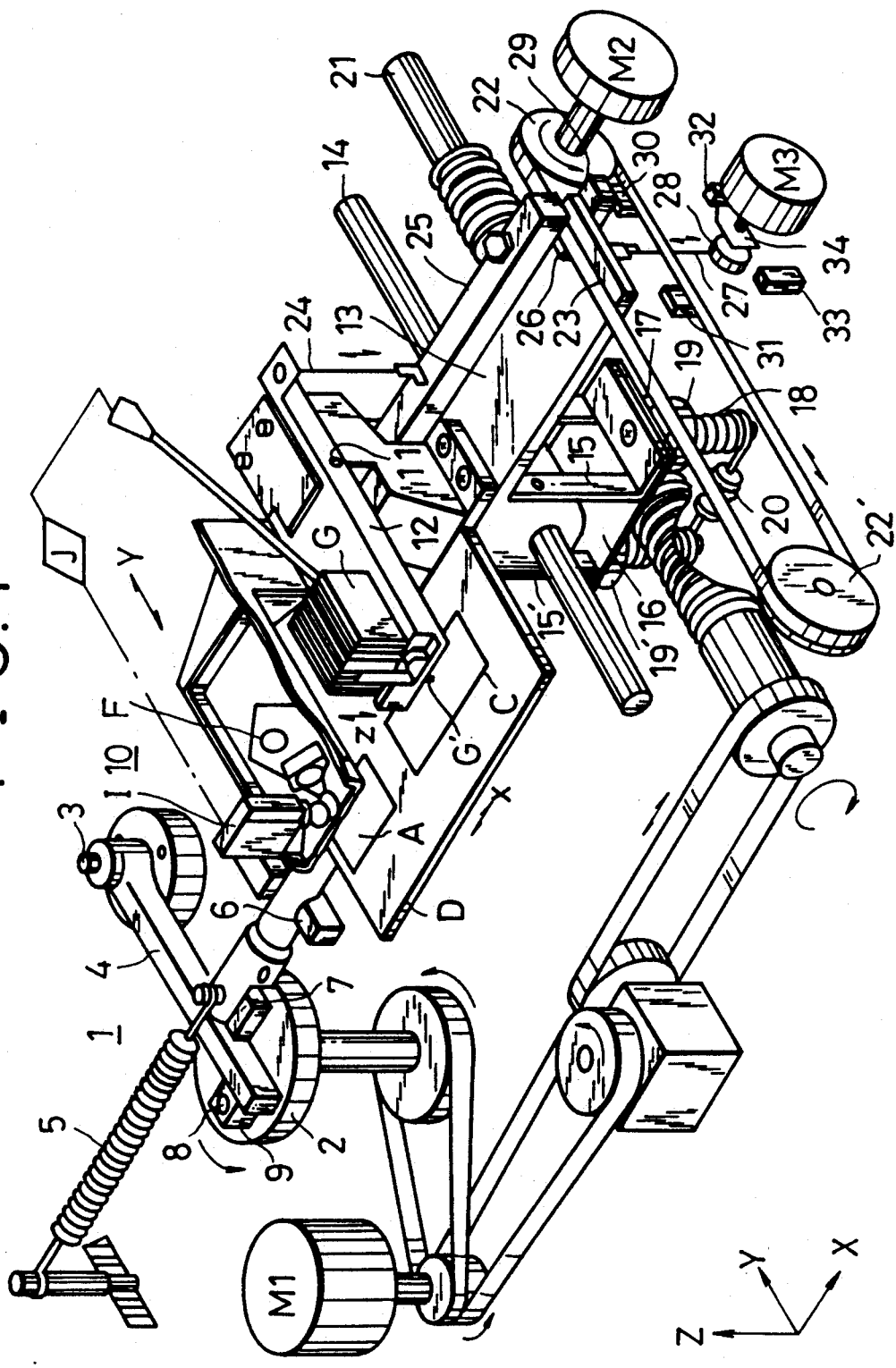
FIG. 1 is an enlarged perspective view of an essential portion of an embodiment of an apparatus for engraving images of the present invention.
Figure 2:
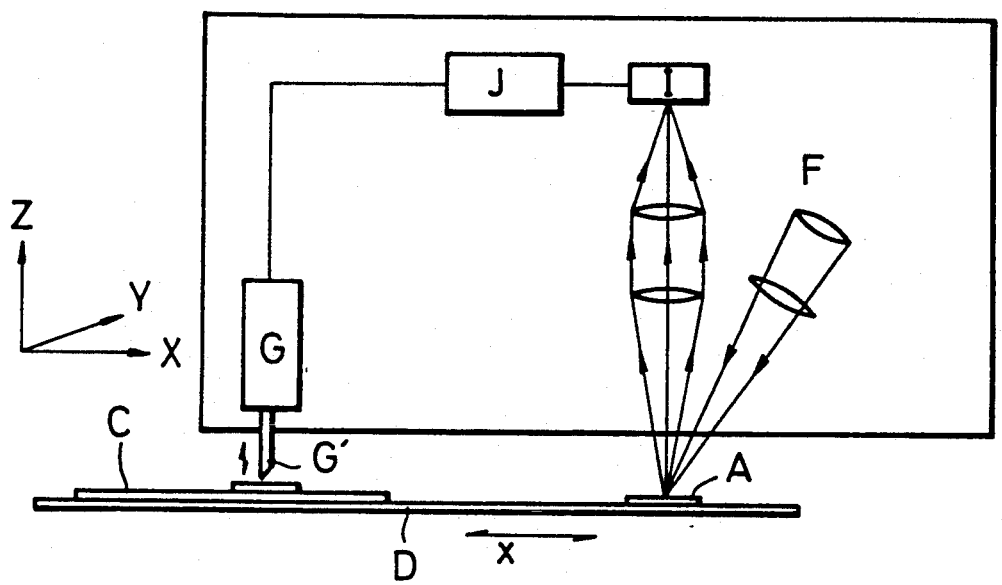
FIG. 2 is a view showing a conventional apparatus for engraving images.
Figure 3:
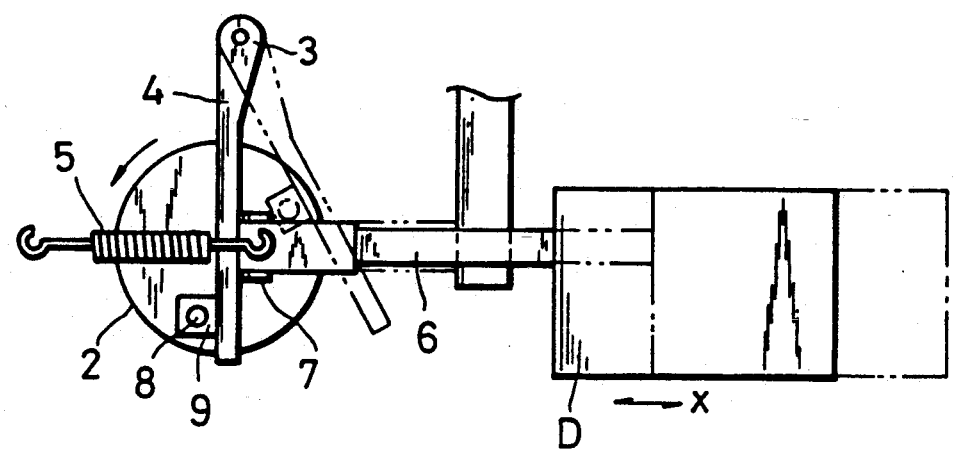
FIG. 3 is a plan view showing an operating state of an engraving table driving apparatus.

In FIG. 1, reference letter D denotes a sliding table, on which an original image A, such as a photograph of a face, and a card C on which a face photograph of the original image A and other information (a picture image) are engraved are fixedly mounted at a predetermined position, which reciprocates in the direction of the X axis indicated by the arrow in the figure. Reference numeral 1 denoted an engraving table driving apparatus, connected to the sliding table D, for making the sliding table D move from side to side in the direction of the X axis. The engraving table driving apparatus is connected via an motor M1, a belt, and the like to the side of the sliding table D, in which apparatus a prismatic ram 4, one end of which is pivotally mounted on a supporting shaft 3 on the top surface of a rotary disc 2 driven horizontally, is swingably mounted on the right and left with the supporting shaft 3 as the center. As shown in FIG. 3, both sides of a square ram 4 are slidably disposed in a state in which the ram 4 is fastened and pressed by a sliding operating piece 7 and a sliding driving piece 9 by means of the energization force of a tensile spring 5 because a rectangular or other polygonal sliding operating piece 7 rotatably mounted on the front end of a driving shaft 6 energized by the tensile spring 5 in an extension direction (to the left in FIG. 1) by being extended from the sliding table D and a polygonal sliding driving piece 9 rotatably mounted by a pin 8 on a predetermined rotational circumference on the top surface of a rotary disc 2 are brought into surface contact with each other or both sides of the ram 4. As a result, by making the rotary disc 2 rotate in the direction of the arrow in the figure, the sliding driving piece 9 disposed on the rotary disc 2 and the sliding operating piece 7 mounted on the front end of the driving shaft 6 are rotatably dislocated with surface contact being maintained in a state in which the ram 4 is fastened and pressed from both sides thereof by the energization force of the tensile spring 5, and it slides on the side of the ram 4, causing the sliding table D to reciprocate in the direction of the X axis according to the rightward or leftward movement of the ram 4.

Reference numeral 10 denotes a photoelectric scanning mechanism disposed oppositely facing the original image A above the sliding table D, in which mechanism are integrally housed a light source F, a photoreceptor I which condenses light from this light source F and makes the light strike the original image A, and receives the reflected light to detect the light and shade thereof, and a control circuit J. Reference letter G denotes an engraving machine equipped with a cutter head G' which moves vertically oppositely facing the card C in the direction of the Z axis above the sliding table D. It is mounted on the front end of an arm 12 rotatably mounted in a vertical direction by means of a pivoted pin 11 and disposed side by side integrally with the photoelectric scanning mechanism 10 on a base 13 in such a manner as to be capable of operating in linkage with each other. The photoelectric scanning mechanism 10 and the engraving machine G are moved back and forth in the direction of the Y axis on the sliding table D together with the reciprocating movement of the base 13 in the direction of the Y axis.

On the bottom surface of the base 13, on which the photoelectric scanning mechanism 10 and the engraving machine G are integrally disposed side by side, which moves back and forth in the direction of the Y axis, a bearing 14 supported on a uniform bearing in such a manner as to be capable of moving back and forth, is integrally fixed on the bottom surface in the direction of the Y axis; the lower portion of two elastic swing plates 15 and 15', in which elastic thin plates are formed in the form of the letter L and are vertically disposed at a proper interval side by side, are connected by an elastic connecting thin plate 16; on the bottom surface thereof are mounted gear wheels 19 and 19' pressed upward toward the connecting thin plate 16 by a pressing spring 18 via a disc friction plate 17 and by a spring 20 stretched mutually in the lower end thereof so as to press the wheels mutually towards the screw shaft as shown in FIG. 1; a gear wheel 21 to which is connected the motor M1 and driven at a proper rotation speed by engaging the bearing 14 in the direction of the Y axis and placed side by side therewith between the gear wheels 19 and 19'; the gear wheels 19 and 19' engaged with a worm gear 21 feed the base 13 in the direction of the Y axis by the rotation of the worm gear 21 in a stationary state as if it is a nut without being rotated by the friction plate 17; and the gear wheels 19 and 19' are rotated and moved in opposition to the frictional resistance of the friction plate 17 during the fast feed of the base 13.

On the other hand, on the top surface of the base 13, a belt 23 wound around a driving pulley 22 and a movement-receiving pulley 22' of a motor M2 is movably disposed in contact with the top surface of the end section of the base side in the direction of the Y axis. A lever 25 connected by a connecting material 24, such as wire, in such a manner as to be capable of moving together in linkage with the arm 12, to the back end of the arm 12, one end of which is rotatably in a vertical direction mounted on the base 13 and in the central section of which the engraving machine G is mounted, above the belt 23. The opening/closing end of this lever 25 is connected to an eccentric cam 28 of a motor M3 which moves in one piece in the direction of the Y axis below the base 13 by means of an operating member, such as wire, inserted into an insertion hole 26 of the base 13. It moves vertically by the rotation of the eccentric cam 28 to fasten and press the belt 23 on the base 13 and causes the engraving machine G to move vertically via the arm 12.

Figure 4:
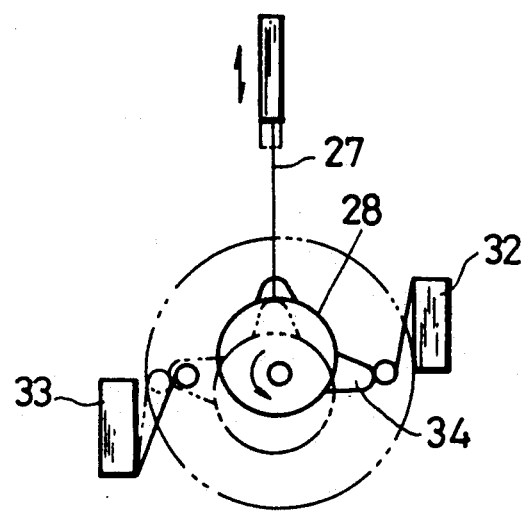
FIG. 4 is a view showing an operating state of an eccentric cam by means of which a lever is moved vertically during the fast feed of the engraving machine.

Reference numeral 29 denotes an operating piece integrally fixed to the base 13; reference numerals 30 and 31 denote limit switches which operate by being brought into contact with the operating piece 29; reference numeral 30 denotes a stop-point limit switch; reference numeral 31 denotes an engraving start-point limit switch; reference numerals 32 and 33 denote switches which operate via an operating piece 34 rotating integrally with the eccentric cam 28 of the motor M3 to maintain the opening/closing operation of the lever 25 disposed above the base 13. As shown in FIG. 4, reference numeral 32 denotes a downward movement switch, and reference numeral 33 denotes an upward movement switch. They are disposed in such a manner as to oppositely face each other at a positional difference of 180° across the operating piece 34 so as to operate each time the eccentric cam 28 makes a half rotation. When the limit switch 30 is operated by the operating piece 29 provided on the base 13, the motor M3 is rotated, causing the lever 25 to move downward via the eccentric cam 28. The operating piece 34 operates the downward movement switch 32 so as to maintain the downward movement state of the lever 25. The operation of the limit switch 31 rotates the eccentric cam 28 to cause the lever 25 to move upward. The operating piece 34 is disposed so as to operate the upward movement switch 33 to maintain the upward movement state of the lever 25, releasing the connection with the belt 23.

Next, the operation of the apparatus will be explained. In FIG. 1, the base 13 is moved backward along the Y axis. The stop-point limit switch 30 in contact with the operating piece 29 is in an operating state. The operating piece 34 of the motor M3 is brought into contact with the downward movement switch 32, causing the lever 25 to move downward via the eccentric cam 28. As a result, the belt 23 is mounted on the base 13 in a fastened state and the engraving machine G is lifted upward by the arm 12 connected to the lever 25.

Figure 6:
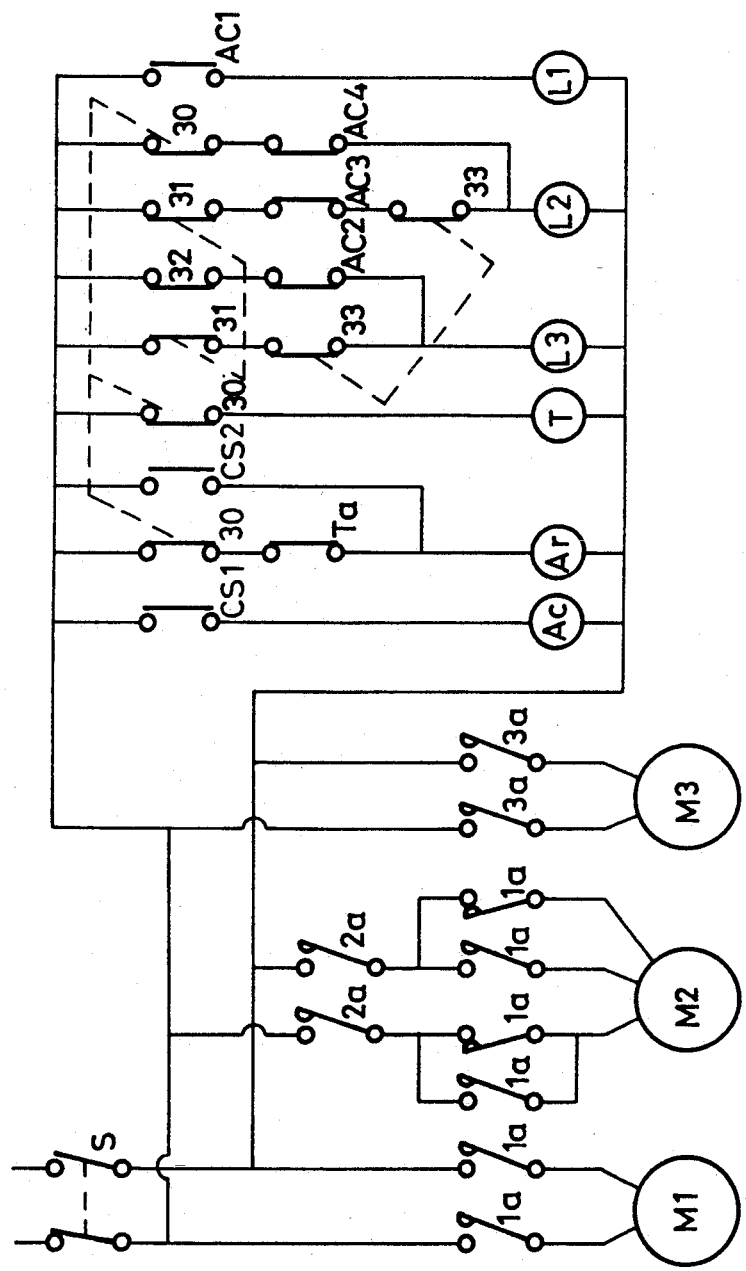
FIG. 6 is an electrical circuit diagram of this apparatus.

When the power-supply switch S shown in FIG. 6 is turned on in this above state to close a starting switch CS1, a contact point AC1 is closed by a keep relay Ac, and the motor M1 is actuated by a relay L1. The rotary disc 2 rotates in the direction of the arrow in FIG. 1. The sliding driving piece 9 rotatably mounted on the rotary disc 2 and the sliding operating piece 7 pivotally mounted on the front end of the driving shaft 6 pulled by the tensile spring 5 slide on the side of the ram 4 in a state in which the ram 4 is fastened from both sides while being dislocated rotationally, causing the sliding table D to reciprocate from side to side in the direction of the X axis via the driving shaft 6. Although, at the same time as the above takes place, a worm gear 21 rotates, the base 13 is not driven because the lever 25 which has moved downward fastens the belt 23 on the base 13. At the same time, a contact point AC3 of the keep relay Ac is closed, and the operation of the relay L2 causes the motor M3 to be started.

At this time, in the motor M2, the contact point 1a of the relay L1 is closed. The base 13 is fed forward along the Y axis via the belt 23 which has rotated forward and is fastened by the lever 25, while the gear wheels 19 and 19' engaged with the worm gear 21 are being rotated in opposition to the resistance of the friction plate 17. When the photoelectric scanning mechanism 10 reaches the original image A and the engraving machine G reaches an engraving starting point on the card C, the operating piece 29 fixed to the base 13 actuates the engraving start-point limit switch 31, thus releasing the energization of the relay L2 to stop the motor M2 and energizing the relay L3 in order to actuate the motor M3, thereby rotating the eccentric cam 28. In response to this, the operating piece 34 is also rotated, causing the upward movement switch 33 to be actuated. The motor M3 is stopped after it makes a half rotation. Because the lower tensile force of the lever 25 is released by the eccentric cam 28, the engraving machine G falls on the cards C. The lever 25 moves upward and the connection thereof with the belt 23 is released. The gear wheels 19 and 19' become stationary due to the action of the friction plate 17. In accordance with the rotation of the worm gear 21, the photoelectric scanning mechanism 10 and the engraving machine G are fed backward in a finely adjusted manner along the Y axis via the base 13.

Figure 5:
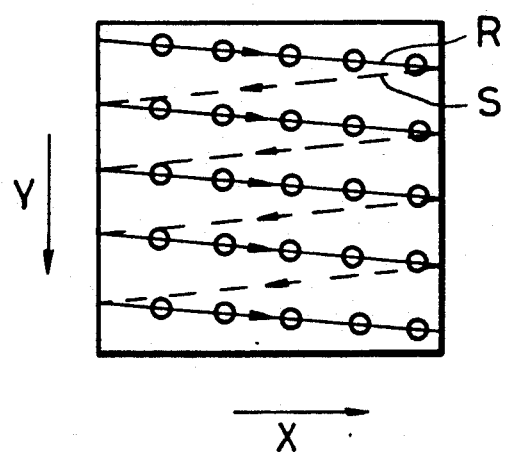
FIG. 5 is an enlarged plan view showing an image engraving scanning method.

In this state, the original image A on the sliding table D which moves from side to side in the X-axis direction is photoelectrically scanned. The cutter head G' of the engraving machine G is moved vertically in the Z-axis direction by the electrical signals of the image. As shown in FIG. 5, the sliding table D moves toward the right. The cutter head G' is operated to perform an engraving only when the sliding table D travels on an engraving line R. Control is performed in such a way that no engraving is performed on the return line S during the leftward movement of the sliding table D. Thus, an image or the like is engraved on the card C in accordance with the light and shade of the original image A.

When the base 13 is fed backward and the operating piece 29 is brought into contact with the stop-point limit switch 30, the energization of the keep relay Ac is released via a reset coil Ar, a contact point AC2 returns, and a relay L3 is energized, thus causing the motor M3 to be rotated. The lever 25 is moved downward by the eccentric cam 28 rotating at the same time, causing the engraving machine G to be separated from the card C. The operating piece 34 contacts the downward movement switch 32, causing the motor M3 to be stopped. The belt 23 is mounted in a fastened manner by the operated lever 25. The motor M1 is stopped by the contact point AC1 and placed in the state shown in FIG. 1. An engraving operation is performed on the card C by repeating the same operation by operating a starting switch CS1 again.

When the engraving machine G returns due to a defective setting of the card C or the original image A, or the like, if the reset switch CS2 is closed, the energization of the keep relay Ac is released by the reset coil Ar. The contact point AC1 is opened, causing the motor M1 to be stopped. And the contact point 1b of the motor M2 is closed, and the motor M2 is connected reversely. The motor M3 causes the eccentric cam 28 to rotate by the closure of the contact point AC2, making the lever 25 move downward. Hence, the engraving machine G is lifted and the belt 23 is pressed in a fastened state. At the same time, the downward movement switch 32 is operated by the operating piece 34 and the motor M3 stops. The motor M2 connected reversely is rotated in reverse via the contact point 1b as the result of the closure of a contact point AC4. While the gear wheels 19 and 19' engaged with the worm gear 21 are rotated in opposition to the resistance of the friction plate 17 by the belt 23, mounted in a fastened state by the lever 25, traveling in a reverse direction, the base 13 is driven forcibly fed rapidly backward along the Y axis until the operating piece 29 reaches the stop-point limit switch 30. Thus, the state of FIG. 1 is created in the same manner as described above. An engraving operation is performed again by the above-described operation.

Although, in this embodiment, a case in which the original image A is photoelectrically scanned and engraved was explained, a picture image from a TV or VTR instead of the original image A is converted into electrical signals and the image or the like can also be engraved by the engraving machine G on the card C on the sliding table D.

As described above, according to the present invention, the engraving table driving apparatus is designed to cause the sliding table D to be reciprocated in the X-axis direction by the ram 4 which swings from side to side with the supporting shaft 3 as the center via a sliding element, such as the sliding driving piece 9 pivotally mounted on the rotary disc 2. No special oil pressure generator is required, unlike a conventional apparatus which is driven by a hydraulic cylinder. In addition, the apparatus does not need to be enlarged without requiring a large rotational radius as does an apparatus which is driven by an eccentric cam. Thus, the apparatus can be produced small in size and inexpensively.

Furthermore, the ram 4 is formed into a prismatic shape. Sliding elements of the sliding driving piece 9, the sliding operating piece 7, or the like, which slide on both sides of the ram 4, are formed into a rectangular or other polygonal shape and are brought into surface contact with each other, serving as a sliding receiver. A smooth operation is performed quietly without causing vibration. Even if dust or dirt is stuck on the sliding surface of the ram 4, it is removed by the above-mentioned polygonal sliding elements which are in surface contact. Thus there is not possibility that dust or dirt will collect on the contact surface. Such a case does not occur, unlike the prior art, in which interference fringes occur in an image due to the nonuniformity of the feed of the sliding table D caused by dust or dirt which enters on the contact surface, thereby causing defects. As a consequence, images can be engraved clearly and accurately.

In the engraving table driving apparatus 1, a swinging slider crank mechanism is used by means of which the sliding table D is made to reciprocate along the X axis by making the ram 4 which rotates with the supporting shaft 3 as the center move from side to side by means of the sliding driving piece 9 on the rotary disc 2. This mechanism is a kind of fast-feed mechanism in which the time of returning a return line S is made earlier than the feed of the engraving line R. The density of the engraving line R on the card C is large, hence, the fidelity of the image is considerably improved and a clear image can be engraved.

In a sliding element, one side of the polygonal is in surface contact. When it is worn down, no replacement of component members is necessary because the other sides contact and slide. Therefore, the apparatus can be used for a long period of time. When it is desired to change the ratio of time of the reciprocation of the sliding table D, the ratio of time can be easily changed by changing the distance from the center of the rotary disc 2 to the supporting shaft 3 of the ram 4. As a result, an image having the requisite clearness can be easily engraved.

The feed of the engraving machine G along the Y axis is driven by causing a screw shaft, such as the worm gear 21 or the like, to be engaged with a supporting member vertically provided in such a manner as to be capable of being dislocated by mutually connecting elastic swing plates 15 and 15' on the bottom surface of the base 13, between the gear wheels 19 and 19' which are stationary during normal times and are made to rotate in opposition to the friction plate 17 when an external force is applied thereto. Even when a dislocation or the like due to a mounting error occurs, to say nothing of an eccentricity or bending of the screw shaft, no machining with a high degree of accuracy, centering, etc. needs to be performed. Unlike an apparatus which is driven by screwing a screw shaft to a conventional nut, a condition of being inoperable to rotate or feed nonuniformity due to changes in the frictional resistance of the screw shaft does not occur. Not only can these errors be satisfactorily absorbed, but the backlash of the screw can also be absorbed because the gear wheels 19 and 19' are engaged from both sides thereof by being fastened and pressed. The apparatus can be produced at a low price. Since a smooth feed operation can be performed, an image having high fidelity can be engraved.

The belt 23 driven by the motor M2 is disposed on the top surface of the base 13 in parallel to the screw shaft along the Y axis in such a manner as to be capable of traveling in either a forward or reverse direction in contact with the top surface of the end section of the base. The lever 25 connected to the eccentric cam 28 is pivotally mounted above this belt 23 in such a manner as to be capable of vertically moving and capable of opening/closing and mounting the belt 23 in a fastened state. Regarding the feed of the engraving machine G to the engraving starting point or a returning operation in the middle of the feed, the base 13 can be quickly fed along the Y axis by making the gear wheels 19 and 19' mounted on the base 13 rotate and roll on the screw shaft in opposition to the friction plate 17 by making the lever 25 move downward so as to mount the belt 23 in a fastened state. The time required to process the cards C is considerably reduced, and a large amount of cards can be engraved. Furthermore, the rapid feed operation is performed by the clutch operation of the lever 25. Since the engraving machine G is lifted in linkage with the downward movement of the lever 25, no damage is caused to the card C during the driving. The apparatus has many, remarkable features, such as described above.

As has been explained above, according to the present invention, the following advantages can be obtained.

Rapid feed can be used for the feed of the engraving machine to the engraving starting point and a returning operation therefor. Thus, time required to perform an engraving onto a card can be shortened considerably.

Even when the eccentricity of a screw shaft, shaft bending, dislocation due to mounting error or the like occurs, unlike a conventional apparatus, no machining with a high degree of accuracy, centering, etc. needs to be performed. A condition of being inoperable to rotate or feed nonuniformity due to changes in the frictional resistance of the screw shaft also does not occur. Furthermore, the backlash of the screw can be absorbed. The apparatus can be produced economically. Since a smooth feed operation can be performed, an image having high fidelity can be engraved.

Unlike a conventional apparatus, no special oil pressure generator is required and the apparatus does not need to be enlarged and it can be produced at a low price.

A smooth operation is performed without causing vibration. Even if dust or dirt is stuck on the sliding surface of the ram, it is removed by polygonal sliding elements which are in surface contact, thus there is no possibility that dust or dirt will collect on the contact surface. As a result, no defective image occurs.

Many different embodiments of the present invention may be constructed without departing from the spirit and scope of the present invention. It should be understood that the present invention is not limited to the specific embodiment described in this specification, and is only limited in the appended claims.

What is claimed is:

1. An apparatus for engraving images, comprising: a sliding table;
   a card on which an image is to be engraved fixedly mounted on said sliding table;
   an engraving table driving apparatus for making said sliding table reciprocate in a first direction;
   an engraving machine, disposed oppositely facing the card on the sliding table, for performing an engraving onto the card by a cutter head;
   a base, integrally mounted with the engraving machine;
   means for reciprocating said base in a second direction perpendicular to said first direction;
   said means for reciprocating including a belt movable in said second direction and positioned over a surface of the base; and
   said means for reciprocating also including a lever pivotally mounted on the base such that the belt is mountable in a fastened state between said lever and a section of the base so as to move said base in said second direction via said belt.

2. An apparatus for engraving images according to claim 1, wherein said lever is connected to an eccentric cam such that said lever is capable of moving in linkage with the eccentric cam, wherein the belt is mounted in said fastened state on the base by the downward movement of the lever, and wherein the base is driven in said second direction by the belt.

3. An apparatus for engraving images according to claim 1, further including an arm rotatably supported by a pivot pin, an end of said arm being connected to the lever via a connecting linkage so as to move said arm along with said lever when said lever is moved, said arm having said engraving machine mounted on an opposite end thereof, such that the engraving machine will move in accordance with the movement of the lever.

4. An apparatus for engraving images according to claim 1, further including: at least one thin elastic connecting plate connected to two elastic swing plates, said swing plates being connected to a bottom surface of said base and being oppositely facing each other and also being in the shape of the letter L on their bottom surfaces; gear wheels disposed horizontally side by side; said gear wheels being pressed upward by a pressing spring; a friction plate interposed between said gear wheels and a bottom of both said elastic swing plates and said connecting thin plate; a screw shaft engaged by said gear wheels, said gear wheels mutually pressed towards said screw shaft by a spring, whereby absorbing the eccentricity of the screw shaft.

5. An apparatus for engraving images according to claim 1, further including the engraving table driving apparatus having a rotary disc which is drive by a motor; a sliding driving piece mounted on the rotary disc; a ram having one side in contact with a first side surface of the sliding driving piece, said ram supported on a supporting shaft such that said ram swings from side to side on the rotary disc; a sliding operating piece mounted on a front end of a driving shaft which is connected integrally with the sliding table, said sliding operating piece being in contact with a second side surface of the ram by a tensile spring; and the sliding table being reciprocated in said first direction by making the ram swing by the rotation of the rotary disc.

6. An apparatus for engraving images according to claim 5, wherein the ram is formed in the shape of a prism, wherein both said sliding operating piece and said sliding driving piece are formed into a polygonal shape, and wherein both said sliding driving piece and said sliding operating piece are adapted so as to contact the ram and slide on said first and second side surfaces, respectively.

* * * * *